United States Patent [19]

Bozman et al.

[11] Patent Number: 5,371,890

[45] Date of Patent: Dec. 6, 1994

[54] PROBLEM STATE CROSS-MEMORY COMMUNICATION USING COMMUNICATION MEMORY DOMAINS

[75] Inventors: Gerald P. Bozman, Oakland, N.J.; John A. Pershing, Jr., Buchanan; Joann Ruvolo-Chong, Peekskill, both of N.Y.

[73] Assignee: International Business Machines Corporation, Armonk, N.Y.

[21] Appl. No.: 785,135

[22] Filed: Oct. 30, 1991

[51] Int. Cl.5 .................... G06F 9/34; G06F 12/00; G06F 15/16

[52] U.S. Cl. .................. 395/700; 395/200; 395/725; 364/DIG. 1; 364/246.6; 364/246.7; 364/286.5; 364/222.5

[58] Field of Search ............ 395/700, 425, 575, 200, 395/725

[56] References Cited

U.S. PATENT DOCUMENTS

| | | | |
|---|---|---|---|
| 4,355,355 | 10/1982 | Batwell et al. | 364/DIG. 1 |
| 4,442,484 | 4/1984 | Childs, Jr. et al. | 364/DIG. 1 |
| 4,521,846 | 6/1985 | Scalzi et al. | 364/DIG. 1 |
| 4,777,589 | 10/1988 | Boether et al. | 364/DIG. 1 |
| 4,979,098 | 12/1990 | Baum et al. | 364/DIG. 1 |

OTHER PUBLICATIONS

Mach and Matchmaker: "Kernel and Language Support for Object-Oriented Distributed Systems" written by Jones et al., OOPSLA '86 Proceedings, Sep. 1986, pp. 67–77.

"Lightweight Remote Procedure Call" written by Brian Bershad et al., Dec. 1989, ACM, pp. 102–113.

"A Porformance Evaluation of the Dash Message-Passing System" written by Tzou et al Tech. Report UCB/CSD 88/452 University of California, Berkeley.

*Primary Examiner*—Eddie P. Chan
*Attorney, Agent, or Firm*—Douglas W. Cameron

[57] ABSTRACT

A method and apparatus for providing non-privileged state cross-memory communications between application programs in disjoint communication memory domains. Appropriate operating systems store a table indicating which communication memory domains and which operations are permitted by a corresponding application program in a corresponding communication memory domain.

5 Claims, 8 Drawing Sheets

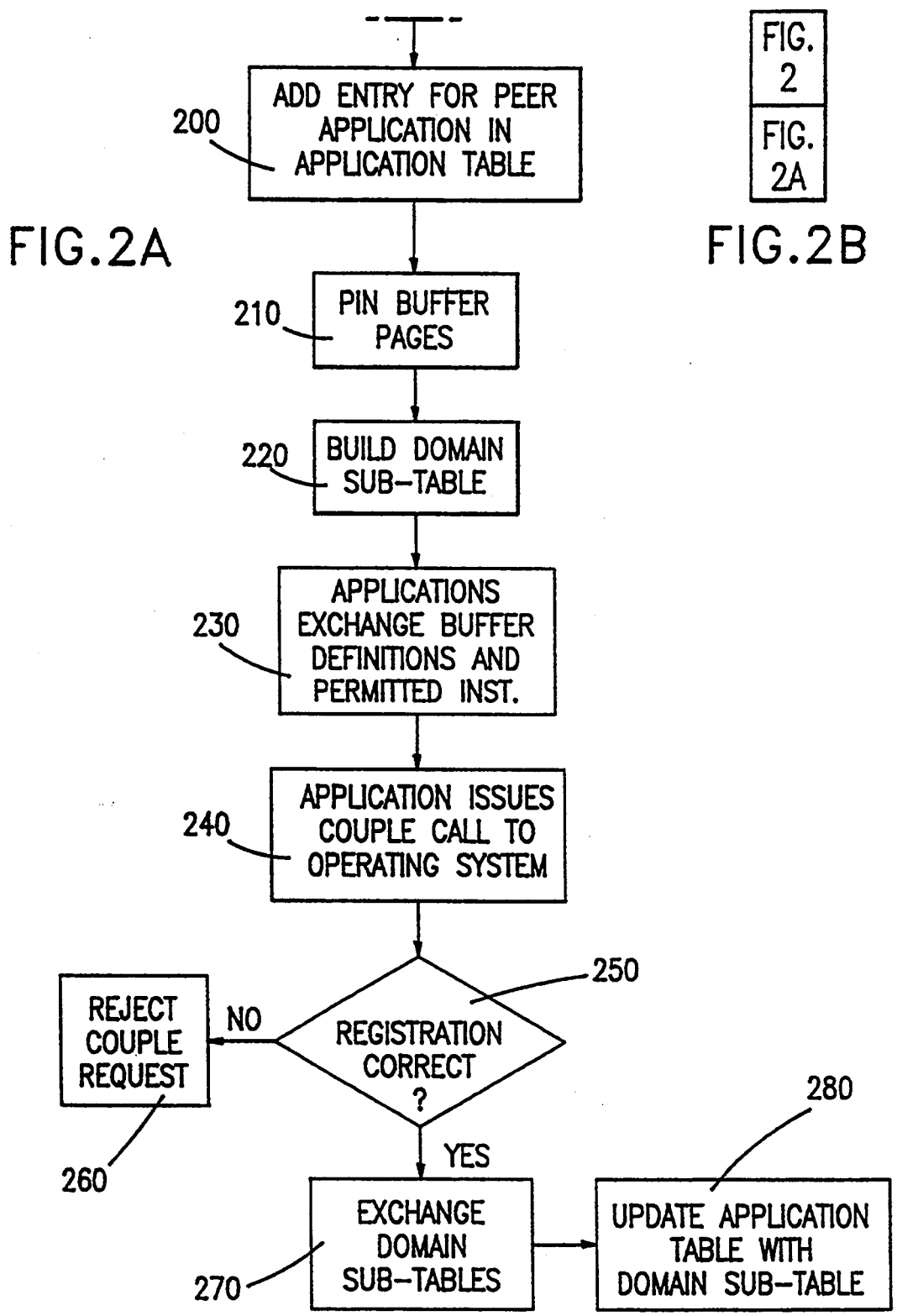

PROBLEM STATE CROSS-MEMORY COMMUNICATION USING COMMUNICATION MEMORY DOMAINS

TECHNICAL FIELD

This invention relates to a method and apparatus for providing cross memory communications between application programs in disjoint communication memory domains on either a set of disjoint computer systems coupled via cross-memory communication operations, or on a single computer system coupled with cross application domain operations.

DESCRIPTION OF THE PRIOR ART

Parallel computing systems are becoming increasingly popular as a means of solving problems that can be partitioned, and also a means of providing high-availability. A common architecture is the interconnection of a cluster of disjoint, distributed memory computers by providing inter-system signalling and inter-system memory read and write operations or their equivalent, or by providing more sophisticated operations that, for example, manipulate a named queue of memory elements on a separate system. Another common architecture is for the distributed memory system to share a single common store that they manipulate via these types of operations.

It is also desirable to provide general-purpose operating system function on computers within the cluster. The inter-system operations are typically designed to run in a privileged machine state (e.g., supervisor state in the 370) in order to prohibit unauthorized use whereas the operating system typically dispatches application processes in an unprivileged state (e.g., problem state on the 370). Therefore, a call to the operating system is required for these inter-system operations and this can easily increase their overhead (measured in machine cycles) by an order of magnitude due to the overhead involved in changing from problem state to supervisor state and then back to problem state. In addition to the overhead of saving and restoring the execution environment, the path through the operating system dispatcher can be significant. For example, even an efficient implementation can have instruction path lengths on each system of 2500 or more instructions for sending even small messages. An alert signal to a remote application takes the form of a message to the dispatcher in the remote system and is approximately the same overhead. Message-passing overhead of this magnitude severely limits the type of applications that can be efficiently executed on the parallel system. On the other hand, if unprivileged execution is allowed, then an erroneous or malicious application can see and alter memory contents to which it is not authorized.

Single systems that manifest a distributed memory view to applications (e.g., MVS, VM/ESA) also suffer from the same set of problems and can also benefit from this invention if they have a set of cross application domain communications operations (e.g., IUCV on VM/ESA) that either are or can be implemented in microcode.

In the prior art, the problem of cross-memory communication performance has been dealt with by 1) reducing the operating system instruction path lengths through optimization or expert coding or 2) avoiding instruction path length by not performing certain functions (like access protection) and accepting the possible consequences.

Bershad, et al, "Lightweight Remote Procedure Call" in Proceedings of the Twelfth ACM Symposium on Operating Systems Principles, December 1989; Tzou et al., "A Performance Evaluation of the DASH Message-Passing System," Technical Report UCB/CSD 88/452, University of California, Berkeley; and Jones et al., "Mach and Matchmaker: Kernel and Language Support for Object-Oriented Distributed Systems" in Proceedings of the Conference on Object-Oriented Programming Systems, Languages and Applications, October 1986 are all examples of reducing path lengths through optimization. These path reductions remain significantly below those obtainable through this invention as the state transition overhead can not be entirely eliminated.

SRC RPC, the native communication system for the Firefly multiprocessor workstation described in Bershad, et al, "Lightweight Remote Procedure Call" in Proceedings of the Twelfth ACM Symposium on Operating Systems Principles December 1989, is an example of trading safety for performance. This allows non-communicating applications to potentially destroy or contaminate each other's communication data either through error or intention. While this may be acceptable in some "trusted" environments, it would not be deemed generally acceptable.

U.S. Pat. No. 4,493,034 to Angelle et al describes a supervisor for a data processing system that dispatches other operating systems.

U.S. Pat. No. 4,500,960 to Babecki et al discloses a multi-processor system wherein each processor supports a plurality of processors which communicate with each other via communication links.

U.S. Pat. No. 4,530,051 to Johnson et al discloses a telecommunication switching system covering remote procedure call and interprocessor message semantics used by the switching system.

U.S. Pat. No. 4,530,052 to King et al discloses a hardware means of allowing multiple operating systems to time muliplex a computer. This patent describes a means for segregating memory, control store and I/O. This patent appeared to be the Honeywell patent that is a precursor of U.S. Pat. No. 4,493,034.

U.S. Pat. No. 4,694,396 to Weisshaar et al discloses a network interface module in a distributed data processing system. This network interface module uses addressing modes which facilitate message transmission between processors resident on different cells in a network. Each cell is capable of conducting data processing operations independently of the other cells.

U.S. Pat. No. 4,747,040 Blanset et al discloses the running of two operating systems on the same computer, one being operated in a non-protected mode (MS-DOS &cR.) and the other being operated in a protected mode (UNIX &cR. operating system). Hardware on a bus prevents the MS-DOS system from erroneously affecting the UNIX system.

U.S. Pat. No. 4,799,145 to Goss et al discloses a means of passing time information correctly across a reboot of a different operating system.

U.S. Pat. No. 4,851,988 to Trottier et al discloses data structures ("mailboxes") by which a process may receive an inter-process message from another process. A process may have many mailboxes, but each mailbox belongs to only one process and has a unique mailbox identifier.

U.S. Pat. No. 4,837,674 to Takane et al discloses a circuit arrangement whereby an I/O interrupt intended for a specified virtual machine is redirected if delivered to another virtual machine.

SUMMARY OF THE INVENTION

It is an object of this invention to provide low-overhead cross memory communication between application programs in a distributed memory system or a distributed memory system with a single, disjoint shared memory, or on a single system with separate application domains. That subset of the application memory domain that is dedicated for communication with a peer(s) application(s) is(are) called a communication memory domain(s). A portion of a shared memory that is assigned or dedicated for communication purposes to a specific application program can be referred to as a communication memory domain. An application domain can also be referred to as a communication memory domain. Each node (e.g., processor(s) and memory) in the distributed memory system is under the control of an operating system. This operating system may be different in each node or be a different instance of the same operating system.

It is a more specific object of this invention to reduce the instruction paths lengths required for cross-memory communications (i.e., inter-operating system or inter-application domain instructions). Cross-memory communications refers to the execution of instructions from one application program using the communications memory domain of another application program. The terms "instruction" and "operation" are used interchangeably in this application.

Accordingly, this invention provides a method and apparatus for cross memory communication between at least two application programs running on two different nodes of a distributed system or in different application domains on a single system. This cross memory communication is provided by having the operating system(s) store a table indicating which cross-memory operations and which portions of memory constitute the communication memory domain that may be used by the applications programs. An application program may then only cross communicate with another application program of its own or another operating system if the table of its own or the other operating system indicates that the application may execute the cross-memory operation and use the communication memory domain of the other application.

The use of the above table eliminates the need for privileged state execution of cross-memory communication instructions. The microcode implementing the communication operations then uses the information in the table to allow or disallow the execution of the operation.

BRIEF DESCRIPTION OF THE DRAWINGS

FIG. 2B, comprising 2 and 2A, describes the initialization process where the peer operating systems satisfy the applications requests to use problem-state communication.

FIG. 3 describes the problem-state execution once the communications environment is initialized.

FIG. 4 describes how the operating system of the target dispatches a target application.

FIG. 5 describes how the peer operating systems terminate an applications session.

DESCRIPTION OF THE PREFERRED EMBODIMENT

Figure 1A:
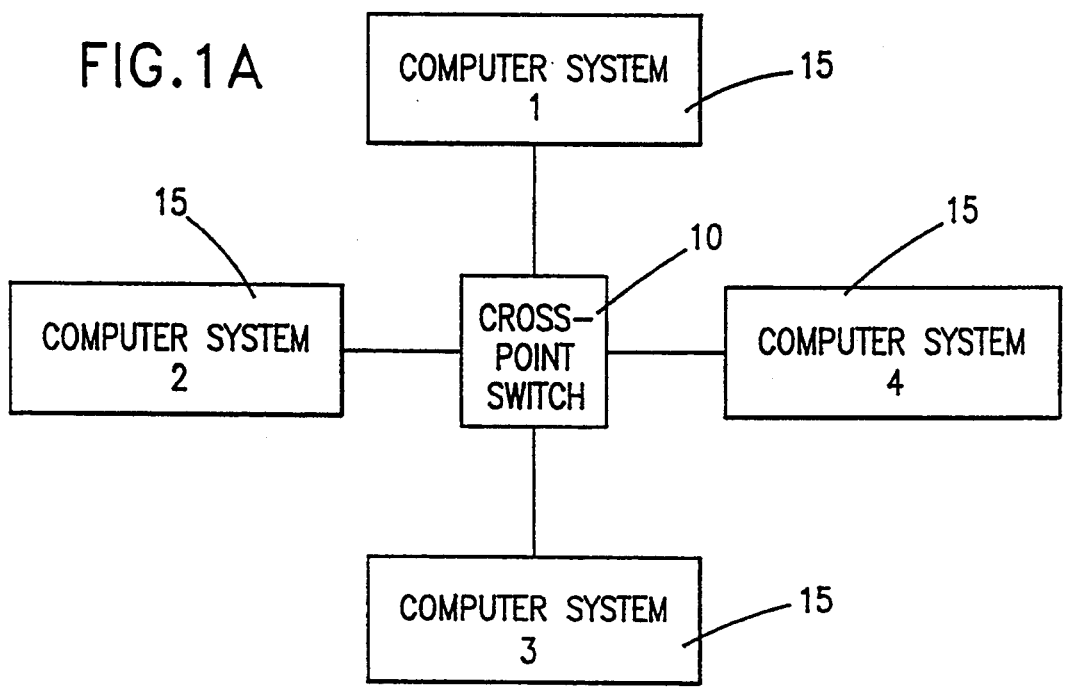
FIG. 1A illustrates a distributed memory system connected via a matrix switch so that any system can read or write data from/to a peer via direct memory access operations.
Figure 1B:
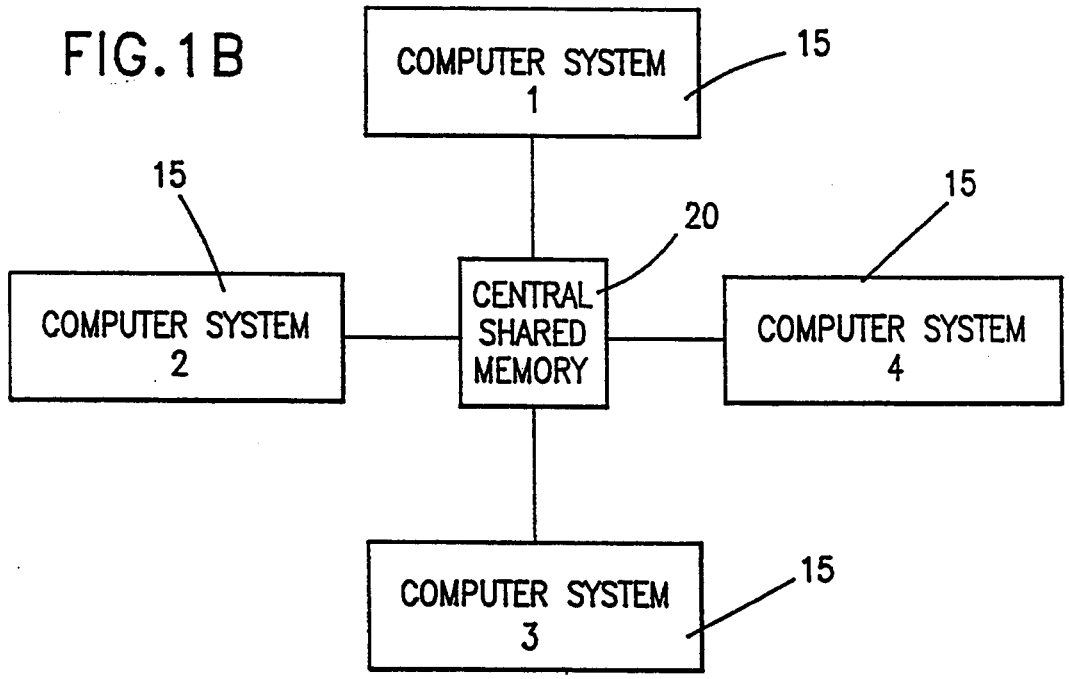
FIG. 1B illustrates a distributed memory system with one common shared memory.
Figure 1C:
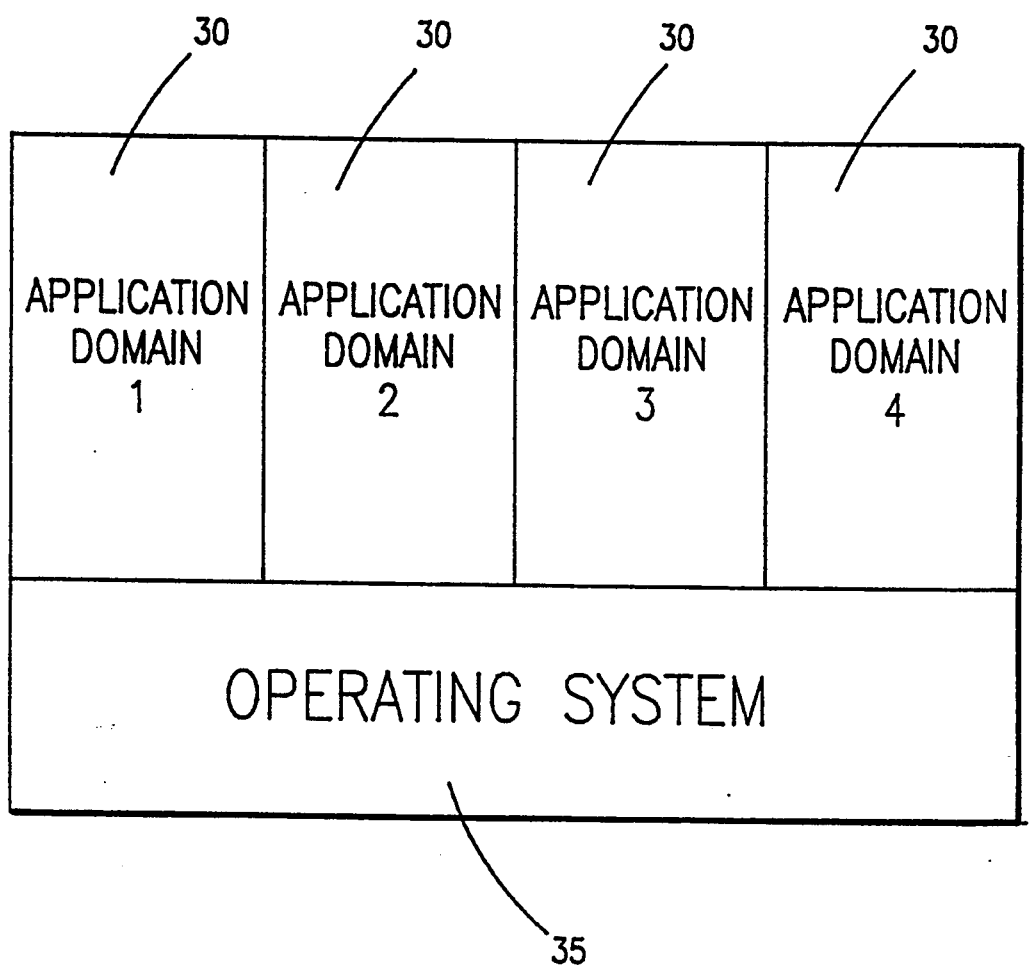
FIG. 1C illustrates a single system with separate application domains.

The implementation described here is for a system with distributed memory and simple read, write and signal operations as pictured in FIG. 1A. FIG. 1A shows a crosspoint switch 10 interconnecting four computer systems 15. The invention can be also be implemented in a distributed system with a separate shared memory 20 and operations that move data in and out of the shared memory (FIG. 1B) or on a single system 35 with operations that communicate across application domains 30 (FIG. 1C). In addition, although this embodiment assumes a simple cross-memory read and write operation, the invention can be implemented with more complex operations (e.g., operations that queue and dequeue elements in a disjoint shared memory). The queues that are assigned or dedicated to an application program can also be referred to as a communication memory domain.

Safe low-overhead problem-state cross-memory communication is implemented by peer operating systems (e.g., the CP component of VM/ESA) and the microcode implementing the inter-system operations (in this embodiment, read and write). Problem-state communication is used by peer applications (e.g., virtual machines in VM). Applications communicate with their local operating system via a standard facility (e.g., diagnose in VM). Peer applications register their intention to use problem-state communication with their local operating system. An application then requests its local operating system to couple it to a peer application. The applications are now engaged in a communication session. The microcode verifies the problem-state cross-memory operations used by the applications and implements them in its normal path (non problem-state) if they are deemed safe. A cross-memory write is used to indicate in the remote process control block that the process (application) should be alerted about the arrival of a message. A process control block is the software structure used by the operating system to control an application's state (e.g., in VM/ESA the VMDBK). When a session is broken the peer operating systems clean up the tables built during the registration and couple process.

Initialization

Figure 2:
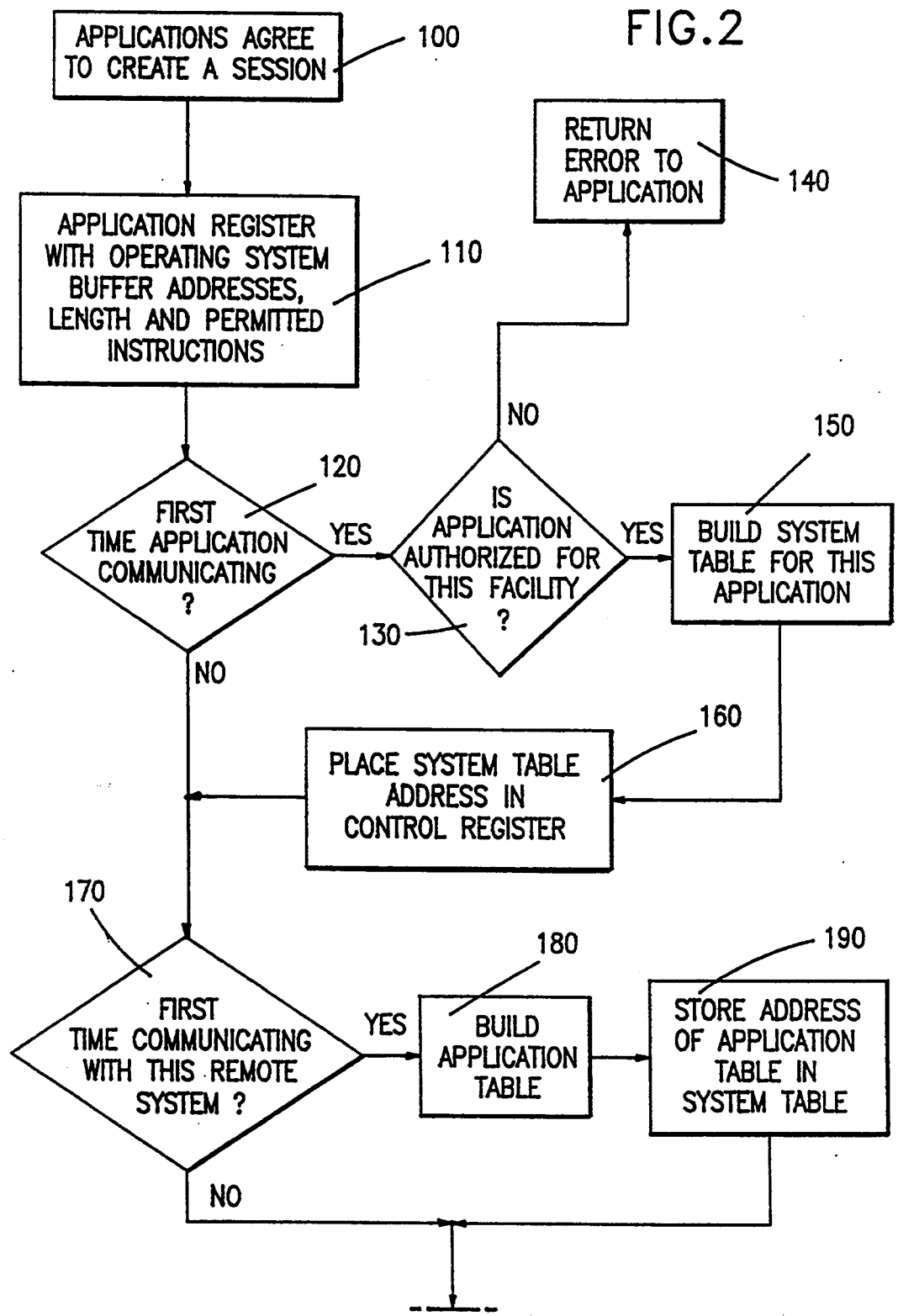
FIGS. 2 to 5 are detailed flow diagrams that describe the four major functions of the invention.

FIG. 2 describes the initialization function of the invention.

An application wishing to set up problem-state communication with a peer, must first communicate with that peer through a standard communications facility (e.g., APPC in IBM systems) to agree upon the creation of a session (step 100).

Each application then registers with its local operating system (step 110), via a diagnose instruction, providing its set of buffer addresses and lengths, the operation(s) permitted on these buffers (e.g., read or write or both) and the identity of its peer (i.e., application-id and system-id).

If this is the first instance of the application communicating with a remote peer (step 120) and if the application is authorized to use problem-state cross-memory operations (step 130), its operating system builds a system table for that application (step 150) and places its address in a protected location available to both the operating system and microcode (e.g., a control register in a 370) (step 160). A null address in this protected location indicates that the application is not authorized for problem state execution of cross-system communication operations. If at step 130, the application is not authorized then an error indication is returned (step 140).

If the application has not previously established communications with the target system (step 170), an application table is built (step 180) and its address is stored in the system table (step 190). If the application has previously established communications with the target system but not with that application an entry is added to the application table (step 200).

The operating system then pins (i.e., makes non-pageable) the set of pages corresponding to the area(s) specified by the application on its registration request (step 210) and creates a domain sub-table containing the logical address and its corresponding real address and size in granules appropriate to the interface and the operations permitted on each memory area (step 220). This domain sub-table will later be sent to the target operating system. Once the operating system returns control to the applications, they exchange their sets of logical logical addresses and lengths and the operations that are permitted on each memory area. (step 230).

After the applications register and exchange addresses, one of them must issue a couple call to its operating system, again via a diagnose instruction, specifying the peer (step 240). The operating systems then communicate via normal communications facilities to verify that each application has registered (step 250). If not, the couple request is rejected (step 260). If so, the domain sub-tables are exchanged (step 270). The application table entries for the remote peers are updated to point to the domain sub-table (step 280).

Problem-state execution

Figure 3:
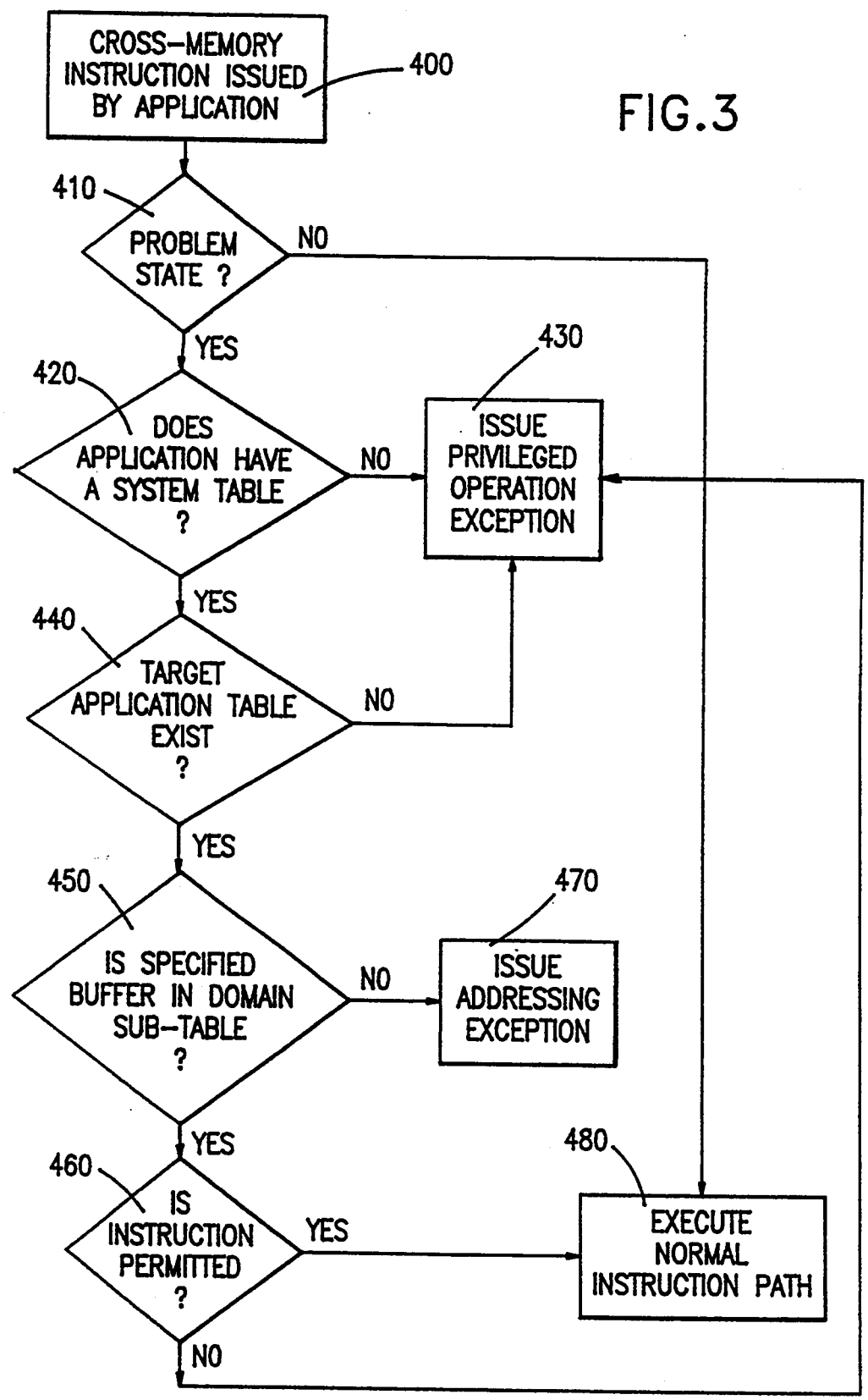

FIG. 3 describes the problem-state execution function of the invention.

To ensure the safety of problem-state cross-memory operations additional checks are made by the microcode that implements the cross-memory operations and program exceptions are issued for violations. Upon detecting a cross-memory operation (step 400), the microcode determines if the operation was issued in problem-state (step 410). If not, the normal instruction path is followed (step 480). If the operation is problem-state and if the application does not have a system table (step 420), a privileged operation exception to the application is issued (step 430). If application does have a system table but there is no application table for the target system (step 440), a privileged operation exception is issued (step 430). If there is an entry for the target application but the target area was not found in the domain sub-table (step 450), an addressing exception is issued (step 470). If there is an entry for the target system but the operation is not permitted (step 460), a privileged operation exception is issued (step 430). If the target area is within the domain sub-table, then the problem-state cross-memory operation has been deemed safe and the operation is executed (step 480).

Dispatching on target system

Figure 4:
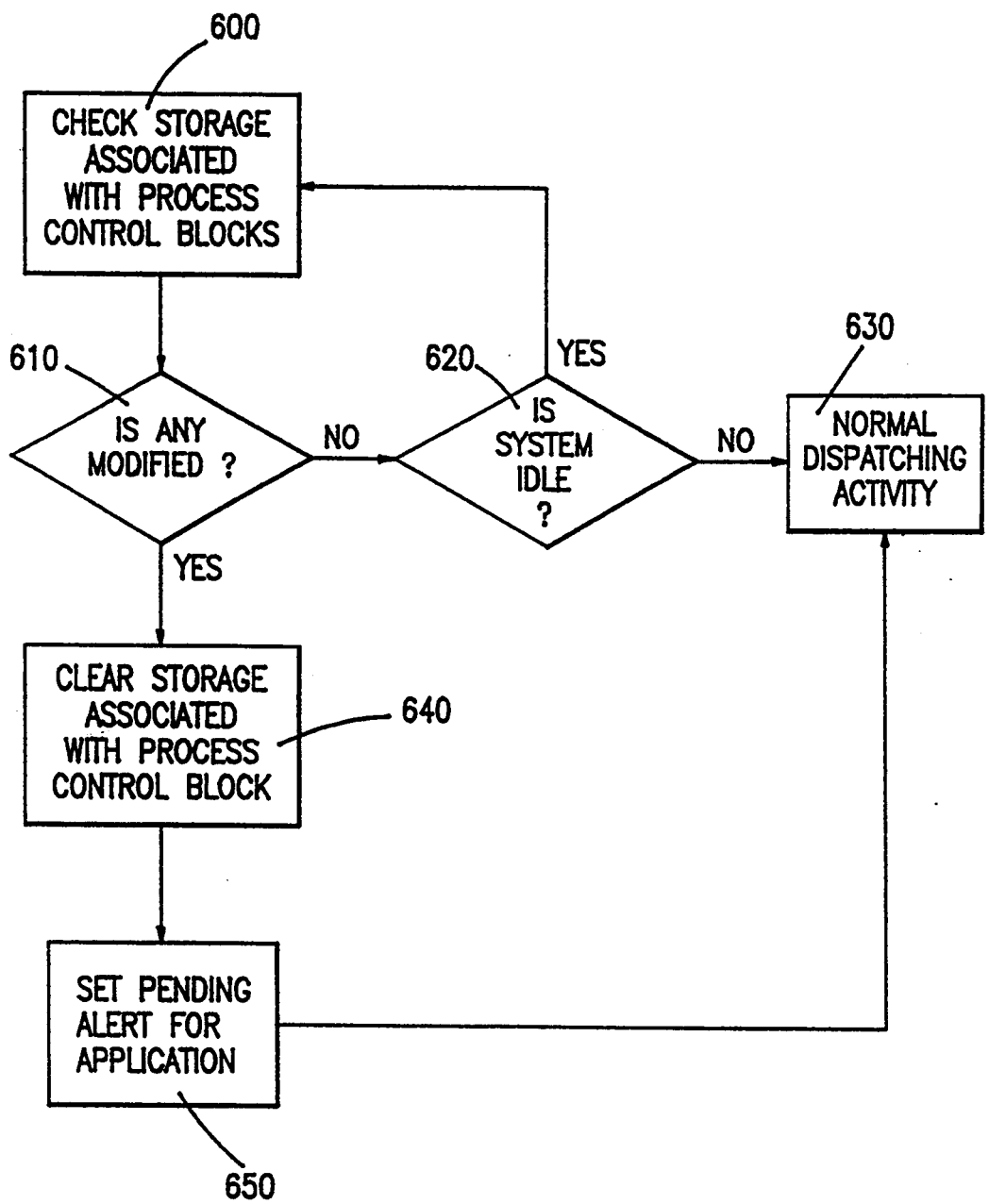

FIG. 4 describes the dispatching function of the invention.

A dispatcher can be implemented so that it never enters an enabled wait state but rather continually scans the state of its active processes while enabled for interrupts: busy wait (e.g., as in VM/ESA).

The dispatcher can be modified to also look at adjunct state information in the form of process control blocks defined in the application tables (step 600). Authorized applications on other systems can optionally set the unit of storage associated with the process control block on the target to its on value to "wake up" its peer. Upon discovering any of these adjunct areas activated (step 610) the adjunct area is cleared (i.e., deactivated (step 640)), and an alert (e.g., a virtual external interrupt in VM) is indicated to be pending for the corresponding application (step 650).

This alert has a special external interrupt code to indicate that it was caused by a communicating peer and, optionally, a code defining the application-id and system-id of the originating application. Since this pending alert will of necessity remove the system from an idle state normal dispatching activity is then done at step 630 (in this case the dispatching of the application with an external interrupt). If at step 610 no areas are activated then a test is made of the system state at step 620. If the system is idle step 600 is reentered, otherwise normal dispatching activity is done at step 630.

Termination

Figure 5:
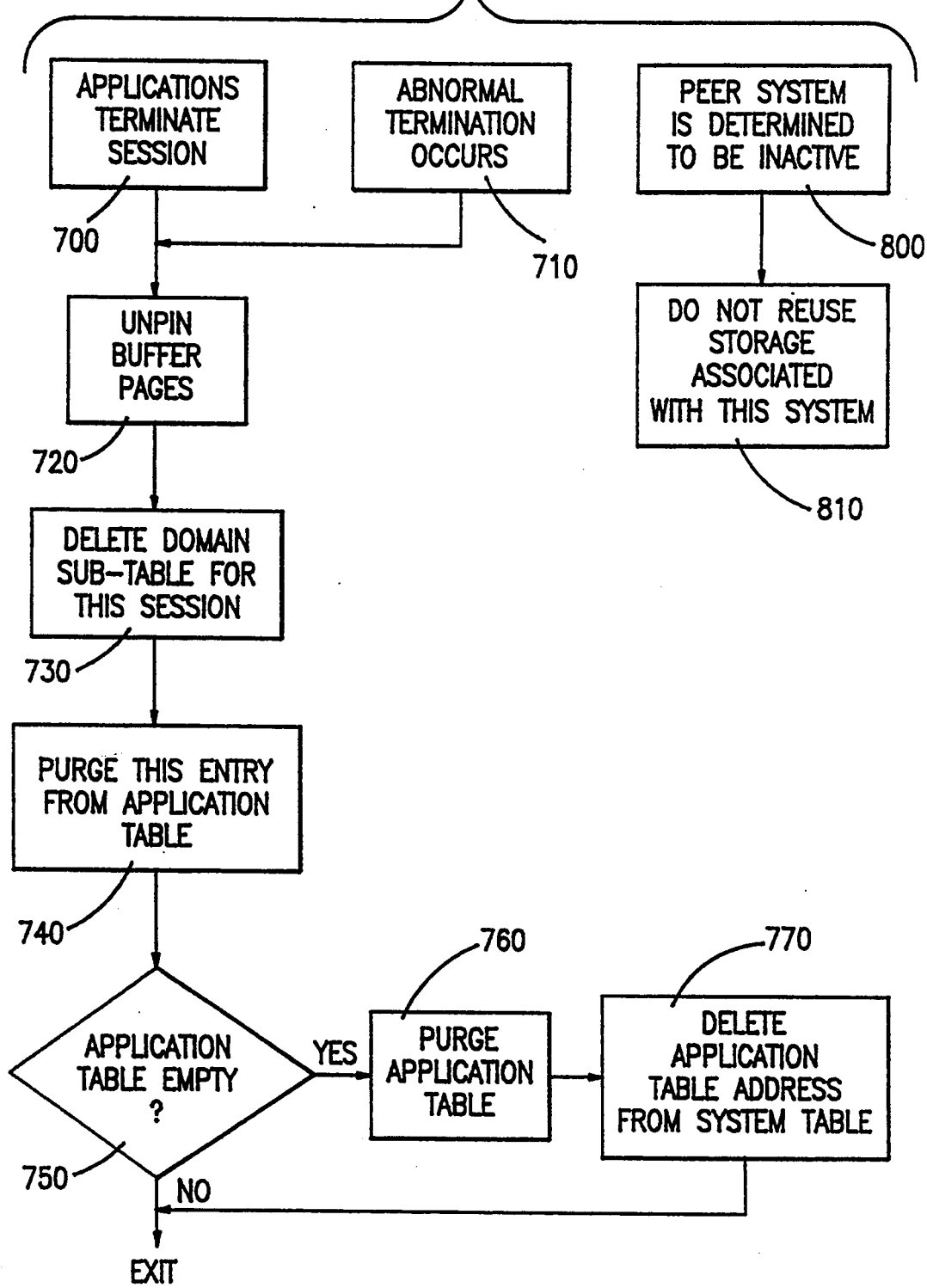

FIG. 5 describes the termination function of the invention.

Normal termination is accomplished by peer applications notifying their respective operating systems of termination of a session with a specified peer (step 700).

Abnormal termination occurs when an application terminates without notifying the operating system of its intention to end active communication sessions (step 710).

The operating system then communicates with the peer operating system to coordinate the unpinning of buffer pages (step 720) and the updating of the appropriate tables. The domain sub-table is deleted (step 730). The entry for the peer application is deleted from the application table (step 740). If the application table has no more entries (step 750) the application table is deleted (step 760), and its address is deleted from the system table (step 770).

Another type of abnormal termination occurs when it is discovered that a peer is no longer active (step 800). In this case the storage associated with that system must not be used for other purposes until communication is reestablished (step 810).

Application communications tables

Figure 6:
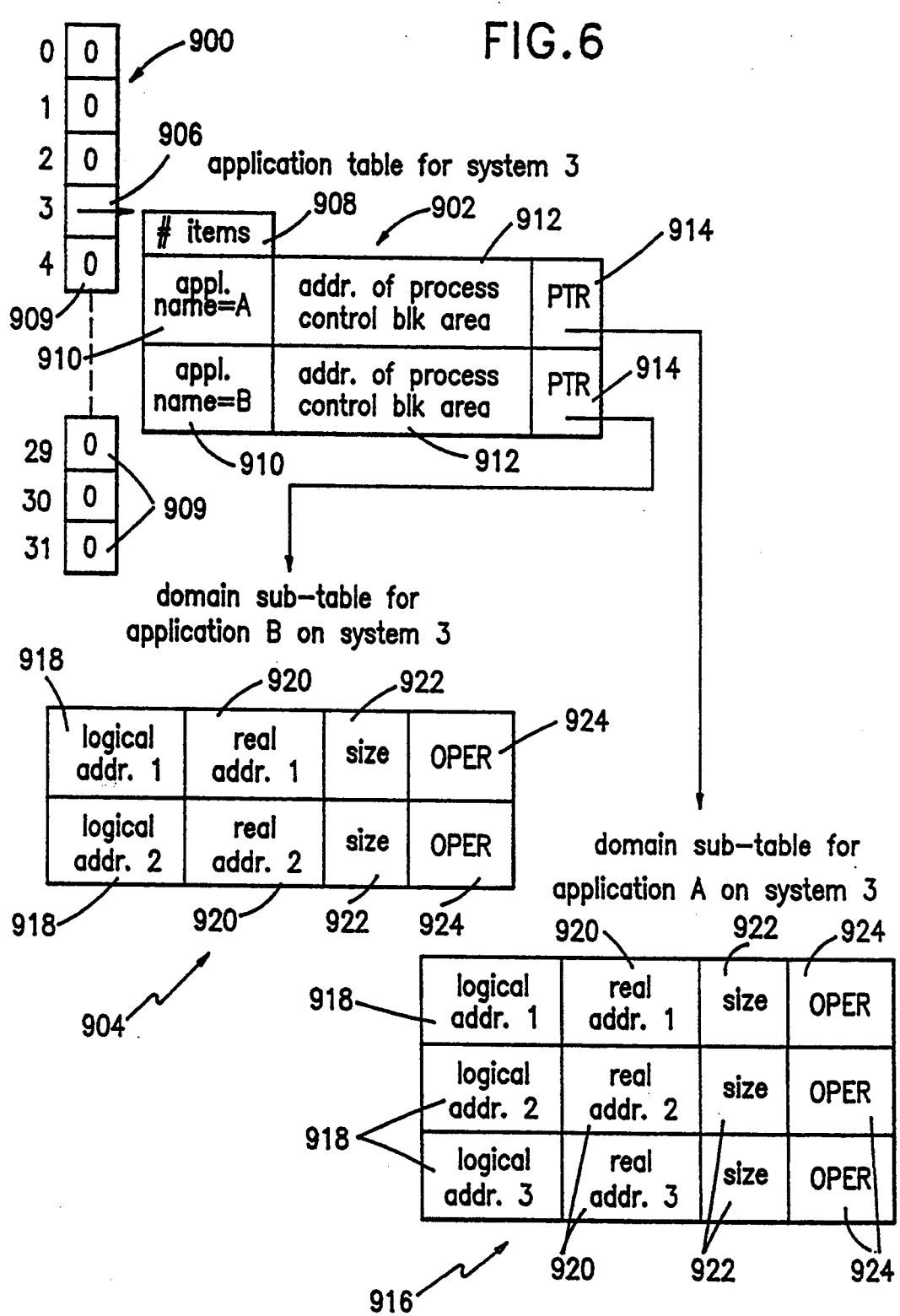
FIG. 6 illustrates the tables that support safe execution in a problem-state environment.

Shown in FIG. 6 are the application communications tables that support safe execution in a problem-state environment. The three application communications tables are the system table (900), the application table (902), and the domain sub-tables (904 and 916). There is one set of application communications tables for each application that has at least one communication session with a peer application. The system table (900) has a vector (906) or a null pointer 909 for each system in the cluster in order of their address. In the example given the table is for a distributed memory system with 32 systems. For the application associated with this table, communication is permitted only with system 3. The null pointer, in the system table, for the other systems indicates that there is no coupling with them by this application. The vector for each coupled system (906) points to a table containing information specific to target applications (902). The first word of each application table contains the number of entries contained in that table (908). Each entry includes the application name (910) and the address of a small unit of storage associated with the process control block of each application (e.g., in VM/ESA the VMDBK) (912). The application associated with this table has a session established with application A and B on system 3. The application table also has a pointer (914) to the domain sub-table for each target application (904, 916). The domain sub-table contains the buffer areas (918, 920, 922) of application A and B and the cross-memory operations allowed (924) on those buffer areas. Specifically, the buffer areas are defined by the logical addresses (918) and its corresponding real addresses (920) and size of each area (922).

Application to other environments

The technique described in this embodiment can be straightforwardly applied to the environment where both applications are under control of one operating system. In this case, all application/operating system interactions occur but, of course, there is no requirement for inter-operating-system communication. The application communication tables are created by the single operating system.

In addition, a disjoint shared-memory environment can be supported by specifying the appropriate operations and communication memory domain in the application communications tables. For example, if the shared memory consisted of application message queues, then the operation allowed for an application's inbound message queue would typically be dequeue, while applications sending messages to another application would be permitted to enqueue. The communication memory domain would represent the appropriate message queue. To the extent that the operating systems have independent access to authorization information then they would have no need to communicate in this environment and can independently set up the appropriate application communications tables.

The various operations on the communication memory domain described herein, read/write and enqueue/dequeue, can be used in any of the environments described. In addition, other more sophisticated operations, if available, can be used by being specified in the application communications tables.

Having thus described our invention, what we claim as new and desire to secure by Letters Patents is:

1. In a multicomputer system having a set of interconnected computer systems, each of said computer systems having the capability to read and write in a separate memory or in a common shared memory, said multicomputer system having a plurality of operating systems and communicating application programs with each of said application programs being supervised by a respective one of said operating systems, a method for providing problem-state cross-memory communication between at least two of said application programs, supervised by different ones of said operating systems, using at least two communication memory domains residing in separate physical memories or in a common shared memory, each said communication memory domain being each a subset of an application memory domain dedicated for communications between at least two of said application programs said method comprising the steps of:

a. registering with its supervising one of said operating systems for each said communicating application program wishing to execute its instruction using the communication memory domain of another application program;

b. storing information in each table, of a plurality of application program communication tables, for each said communicating application program, by its supervising one of said operating systems, each said table indicating which cross-memory operations by which of said application programs are permitted on which of said communication memory domains;

c. upon examining the content of one of said tables, permitting one of said application programs to execute a cross-memory access operation within a communications memory domain of another of said application programs when a table, of said tables, stored by an operating system supervising said one application program indicates that said access operation cross-memory is permitted on said communication memory domain of another of said application programs; and d. allowing said one application program, upon completion of execution of cross-memory operation, to signal a dispatcher component of an operating system supervising said other application program that said memory access operation has created a condition that requires processing by said other application program, thereby permitting problem state cross memory communication between at least two of application programs.

2. A method as recited in claim 1, wherein each said communication memory domain comprises a plurality of memory areas assigned to be used by one of said application programs.

3. A method as recited in claim 1, wherein each said communication memory domain comprises a queue assigned to be used by one of said application programs.

4. A method as recited in claim 1, wherein a memory area associated with a communication memory domain is used to signal the dispatcher component of the operating system supervising an application program that owns a memory area(s) described by latter said communication memory domain that communication data has arrived for latter said application program, said memory area being a part of, or associated with, a process control block of latter said application program.

5. A method as recited in claim 1, wherein each said table has an entry for each peer application program of said programs with which an application program of said programs will communicate, each said entry comprising a set of three data elements which define said peer application program's communication memory domain(s) and operation(s) permitted on said domain(s), said three data elements being: (1) a memory address, (2) a length associated with said address, and (3) permitted operation(s) on said communication memory domain defined by said memory address and said length.

* * * * *